(12) United States Patent
Hosokawa et al.

(10) Patent No.: US 6,424,423 B1
(45) Date of Patent: Jul. 23, 2002

(54) CHARACTER INFORMATION PROCESSING DEVICE

(75) Inventors: Takeshi Hosokawa, Shiojiri; Takuya Suetani, Tokyo; Tomoki Nakamura, Tokyo; Nobuyuki Horii, Tokyo, all of (JP)

(73) Assignees: Seiko Epson Corporation; King Jim Co., Ltd., both of Tokyo (JP)

( * ) Notice: Subject to any disclaimer, the term of this patent is extended or adjusted under 35 U.S.C. 154(b) by 0 days.

(21) Appl. No.: 09/420,526

(22) Filed: Oct. 19, 1999

(30) Foreign Application Priority Data

Oct. 22, 1998 (JP) .......................................... 10-300583

(51) Int. Cl.[7] .............................................. G06K 15/00
(52) U.S. Cl. ...................................................... 358/1.11
(58) Field of Search ................................. 358/1.1, 1.11, 358/1.16, 467, 470, 1.13, 1.18; 400/171, 172, 109, 110, 62, 72; 345/467, 468, 471, 472

(56) References Cited

U.S. PATENT DOCUMENTS 5,854,884 A * 12/1998 Watanabe et al. .......... 358/1.11
6,072,584 A * 6/2000 Watanabe et al. .......... 358/1.18

* cited by examiner

*Primary Examiner*—Arthur G. Evans
(74) *Attorney, Agent, or Firm*—Hogan & Hartson, L.L.P.

(57) ABSTRACT

A character information processing apparatus prints at least one line of an input character string on a printing medium having a size limited at least in width thereof. There is stored information of settings concerning at least one attribute of a first kind of predetermined attributes concerning a layout of characters of the input character string and a second kind of predetermined attributes which can be set to the characters of the input character string on character-by-character basis, in a manner correlating the information of the settings with the input character string. A first instruction signal is generated to start a modification process for modifying the information of the settings. In response to the first instruction signal, the information of the settings stored in the attribute information storage means is modified by using menu screens containing, as menu options, information of all settings which can be set to the first kind of the predetermined attributes and the second kind of the predetermined attributes. A second instruction signal is generated for directly instructing modification of the information of the settings. In response to the second instruction signal, the information of the settings is modified according to a cyclic order assigned to a plurality of settings of the first kind of the predetermined attributes and the second kind of the predetermined attributes.

16 Claims, 6 Drawing Sheets

| HIERARCHICAL LEVELS | 1ST LEVEL | 2ND LEVEL | 3RD LEVEL | 4TH LEVEL | |
|---|---|---|---|---|---|
| TITLE | PARAGRAPH STYLE | SELECTED AT 1ST LEVEL | SELECTED AT 2ND LEVEL | SELECTED AT 3RD LEVEL | |
| MENU OPTIONS | CHAR.SIZE | AUTO EASY | UNIFORM | TO NEXT OPTION AT 1ST LEVEL | |
| | | 1 LINE | T_1 a<br>S_1 b<br>M_1 c<br>L_1 d<br>VL 1 e | TO NEXT OPTION AT 1ST LEVEL | |
| | | 2 LINES | EASE & FLEX | SPECIAL INPUT SCREEN | TO 1ST LEVEL |
| | | | LL 2 a<br>MM 2 b<br>L S 2 c<br>S L 2 d | TO NEXT OPTION AT 1ST LEVEL | |
| | | 3 LINES | EASE & FLEX | SPECIAL | TO 1ST LEVEL |
| | | | 4 L 5 e<br>5 L 5 f | | |
| | | 6 LINES | EASE & FLEX | SPECIAL INPUT SCREEN | TO 1ST LEVEL |
| | | | UNIFORM 6 a<br>UPPER L 6 b<br>LOWER L 6 C | TO NEXT OPTION AT 1ST LEVEL | |
| | | 7~8 LINES | TO NEXT OPTION AT 1ST LEVEL | | |
| | LAYOUT | FWD ALGN<br>CNT ALGN<br>UNIFORM<br>REAR ALGN | TO NEXT OPTION AT 1ST LEVEL | | |
| | FRM / TBL | NONE | TO NEXT OPTION AT 1ST LEVEL | | |
| | | TABLE | 0 1<br>0 2<br>:<br>1 0 | TO NEXT OPTION AT 1ST LEVEL | |
| | | 0 1<br>:<br>5 3 | TO NEXT OPTION AT 1ST LEVEL | | |
| | END ? | EFFECTIVE RANGE ?<br>WRITING<br>PARAGRAPH | | | |

CHARACTER INFORMATION PROCESSING DEVICE

BACKGROUND OF THE INVENTION

1. Field of the Invention

This invention relates to a character information processing device for printing or transfer printing of at least one line of an input character string on a printing medium or a transfer medium having a size limited at least in the direction of width thereof, which can be applied e.g. to a tape printing apparatus or a stamp making apparatus.

2. Prior Art

The tape printing apparatus prints at least one line of a string of entered characters (including symbols and pictographic characters) on a continuous tape as required, and manually or automatically cuts off a printed portion of the tape for delivery. In view of various uses of the printed portion thus cut off (hereinafter referred to as the "label"), tape printing apparatuses recently available are capable of printing even a plurality of lines of a character string on a tape to form a label. Further, from the nature or use of labels, the character string is often printed by setting a different character size to each line thereof.

As manners of designation of character sizes (character size designation modes) for the plurality of lines, one of the tape printing apparatuses recently available has two kinds of a "character size-entrusting mode", and a "line count-dependent relative size combination mode".

The "character size-entrusting mode" is a mode in which the tape printing apparatus automatically determines the character size of each line without being instructed by the user. In the first kind of this mode (hereinafter referred to as "auto-with-ease mode"; also denoted as "easy mode" in the drawings), based on information of the number or count of lines of an input character string, the width of a tape loaded in the apparatus, and the number of characters of each line, the character size of each line is determined such that the printed lines have approximately the same length irrespective of the number or count of characters of each line. In the second kind of this mode (hereinafter referred to as "uniform mode"), based on information of the number or count of lines of an input character string, and the width of a tape loaded in the apparatus, the character size of each line is set to an identical size.

Figure 7A:
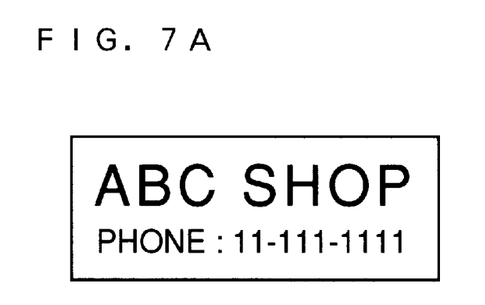
FIGS. 7A and 7B are explanatory views which are useful in explaining an auto-with-ease mode and a uniform mode which are the two kinds of the character size-designation mode.
Figure 7B:
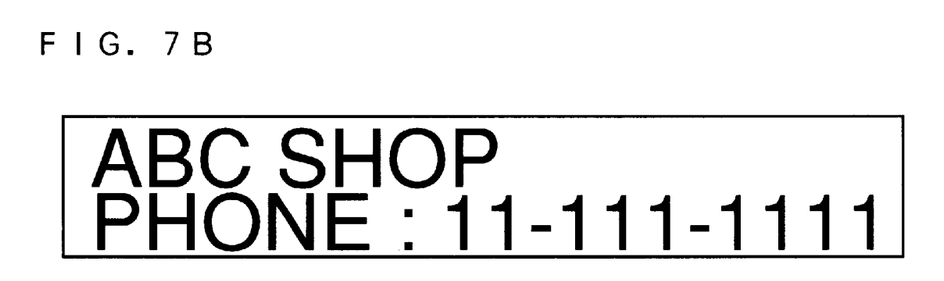

FIGS. 7A and 7B show labels formed by printing an identical character string, with character sizes thereof designated in the "auto-with-ease mode" (FIG. 7A), and in the "uniform mode" (FIG. 7B), respectively.

The "line count-dependent relative size combination mode" is a mode in which the user designates a combination of relative character sizes for lines of an input character string, and the apparatus converts the relative character sizes to absolute ones based on information of the width of a tape loaded in the apparatus and so forth. For instance, when the number of lines of an input character string is three, the user selects and sets one of combinations of relative character sizes of the respective lines, such as "SAME×3" (identical size for all of three lines), "SSL" (Small+Small+Large), "SLL" (Small+Large+Large), "LSS" (Large+Small+Small), or "LLS" (Large+Large+Small), and the tape printing apparatus converts the relative character sizes to absolute ones based on the width of a tape and so forth. That is, in this mode, the character sizes of lines of a character string are semi-automatically set.

As described above, there are various manners of designating the character sizes of lines of a character string, and hence in the conventional tape printing apparatuses, they are designated or changed from menu screens.

Of course, the default mode is fixed. One of the conventional tape printing apparatus uses the "auto-with-ease mode" or the "uniform mode" (one of the two kinds of the "character size-entrusting mode") as the default mode thereby permitting the tape printing apparatus to deal with the setting of character sizes even when the user does not intentionally designate the character sizes (relative ones) of lines of an input character string.

It should be noted that the designation of a character size of each line involves determination or setting of line pitches and margins at lateral ends of a tape (so-called "outer frame width"), and hence may be called a designation of layout of characters (also referred to as "character layout").

Further, as an attribute defining the layout of characters, in addition to the character size attribute of each line, there is a layout attribute. That is, the user is allowed to designate one from the options of "forward alignment" in which positions of characters at respective forward ends of lines are aligned and character pitches of the respective lines are each determined based on a character size set thereto, "rearward alignment" in which positions of characters at respective rearward ends of lines are aligned and character pitches of the respective lines are each determined based on a character size set thereto, "center alignment" in which positions of characters at respective centers of lines are aligned and character pitches of the respective lines are each determined based on a character size set thereto, and "uniform layout" in which positions of characters at the forward end of lines and positions of characters at the rearward end of lines are aligned and character pitches of the respective lines are each determined such that the characters are arranged with uniform character pitch or spacing. In the conventional tape printing apparatus, such layout attributes are also designated or changed from menu screens.

Further, there are other attributes which are not related to the character layout but designated or changed from menu screens. For instance, typeface attributes (e.g. Mincho typeface, Gothic typeface, and the like), and character modification attributes (italic, outline, etc.), are also designated or changed from menu screens.

As described above, there are many kinds of character size-related attributes, and hence the menu screens are made hierarchical in practice, so that the operation for changing one menu screen for a character size-related attribute to another for another character size-related attribute is troublesome.

Further, for beginning users, it is difficult to determine which is the best combination of relative sizes for lines, and therefore, most users prefer to select the "character size-entrusting mode". However, since there are two kinds of this mode, users often desire to make a change between them. This change is also made via one of the aforementioned menu screens which are hierarchical, and hence the operation required therefor is troublesome.

Similarly, the layout attribute, typeface attribute, and character modification attribute are also changed via respective menu screens therefor, and requires troublesome operations.

These inconveniences are encountered not only when the tape printing apparatus is used but also when other character information processing apparatuses (e.g. stamp making apparatus) which involves setting of various kinds of character size attributes for each line, various kinds of layout attributes, etc.

SUMMARY OF THE INVENTION

It is a first object of the invention to provide a character information processing apparatus which is easy to operate in changing a setting of a predetermined attribute concerning the character layout or each single character of a character string (character size attribute of each line, layout attribute, typeface attribute, character modification attribute, and the like).

It is a second object of the invention to provide a character information processing apparatus which permits present settings of predetermined attributes concerning the character layout or each single character of a character string to be correctly grasped, thereby permitting proper judgement of necessity of modification or confirmation of the resulting modification.

To attain the above object, according to a first aspect of the invention, there is provided a character information processing apparatus for printing at least one line of an input character string on a printing medium having a size limited at least in width thereof. the character information processing apparatus comprising:

attribute information storage means for storing information of settings concerning at least one attribute of a first kind of predetermined attributes concerning a layout of characters of the input character string and a second kind of predetermined attributes which can be set to the characters of the input character string on character-by-character basis, in a manner correlating the information of the settings with the input character string;

first modification process-starting means for generating a first instruction signal to start a modification process for modifying the information of the settings;

first information modification means responsive to the first instruction signal generated by the first modification process-starting means, for modifying the information of the settings stored in the attribute information storage means by using menu screens containing, as menu options, information of all settings which can be set to the first kind of the predetermined attributes and the second kind of the predetermined attributes;

second modification process-starting means for generating a second instruction signal for directly instructing modification of the information of the settings stored in the attribute information storage means; and second information modification means responsive to the second instruction signal generated by the second modification process-starting means, for modifying the information of the settings stored in the attribute information storage means according to a cyclic order assigned to a plurality of settings of the first kind of the predetermined attributes and the second kind of the predetermined attributes.

Preferably, the cyclic order is assigned to a plurality of settings of part of the first kind of the predetermined attributes and the second kind of the predetermined attributes, and if the information of settings concerning the at least one attribute stored in the attribute information storage means includes information of a setting of the part of the first kind and the predetermined attributes of the second kind when the second modification process-starting means generates the second instruction signal, the second information modification means changes the setting of the part to a next setting in the cyclic order.

More preferably, when the second modification process-starting means generates the second instruction signal, if it is impossible to change the information of the settings such that the information of the settings includes information of the next setting in the cyclic order, the second information modifications means does not execute modification of the information of the settings.

Preferably, the character information processing apparatus includes print image-updating means for updating an image for printing displayed in combination with a character entry screen immediately before any one of the first modification process-starting means and the second modification process-starting means generates a corresponding one of the first instruction signal and the second instruction signal, in accordance with modification of the information of the settings stored in the attribute information storage means carried out by a corresponding one of the first modification means and the second modification means in response to the corresponding one of the first instruction signal and the second instruction signal.

To attain the first object, according to a second aspect of the invention, there is provided a character information processing apparatus for printing at least one line of an input character string on a printing medium having a size limited at least in width thereof, the character information processing apparatus comprising:

attribute information storage means for storing information of settings concerning at least one attribute of a first kind of predetermined attributes concerning a layout of characters of the input character string and a second kind of predetermined attributes which can be set to the characters of the input character string on character-by-character basis, in a manner correlating the information of the settings with the input character string;

first modification process-starting means for generating a first instruction signal to start a modification process for modifying the information of the settings;

first information modification means responsive to the first instruction signal generated by the first modification process-starting means, for modifying the information of the settings stored in the attribute information storage means by using menu screens containing, as menu options, information of all settings which can be set to the first kind of the predetermined attributes and the second kind of the predetermined attributes;

a plurality of second modification process-starting means corresponding respectively to at least part of settings concerning the first kind of the predetermined attributes and the second kind of the predetermined attributes, for generating respective second instruction signals for directly instructing modification of the information of the settings stored in the attribute information storage means; and second information modification means responsive to any one of the second instruction signals generated by a corresponding one of the plurality of second modification process-starting means, for modifying the information of the settings stored in the attribute information storage means such that the information of the settings includes information of a setting corresponding to the corresponding one of the plurality of second modification process-starting means.

Preferably, when the corresponding one of the plurality of second modification process-starting means generates the any one of the plurality of second instruction signals, if it is impossible to change the information of the settings such that the information of the settings includes information of the setting corresponding to the corresponding one of the plurality of second modification process-starting means, the second information modifications means does not execute modification of the information of the settings.

Preferably, the character information processing apparatus includes a plurality of indicators corresponding to a plurality of settings each of which can be set by the second information modification means, and lighting means for, when the second information modification means has modified the information of the settings stored in the attribute information storage means, lighting at least one of the plurality of indicators corresponding to settings resulting from the modification.

Preferably, the information of the settings concerning the at least one attribute includes information of designation of a character size for each line.

More preferably, a plurality of settings concerning a predetermined attribute each of which can be set by the second information modification means includes a setting in which character sizes for lines are automatically designated such that all of the lines have substantially the same length when the lines are printed on the printing medium, and a setting in which the character sizes for the lines are automatically set to an identical character size.

Preferably, the information of the settings concerning the at least one attribute includes information of designation concerning a layout attribute of characters on a corresponding line of the input character string.

Preferably, the information of the settings concerning the at least one attribute includes information of designation concerning a typeface attribute of each character of the input character string.

Preferably, the information of the settings concerning the at least one attribute includes information of designation concerning a character modification attribute of each character of the input character string.

Preferably, the character information processing apparatus includes print image-updating means for updating an image for printing displayed in combination with a character entry screen immediately before any one of the first modification process-starting means and the plurality of second modification process-starting means generates a corresponding one of the first instruction signal and the plurality of second instruction signals, in accordance with modification of the information of the settings stored in the attribute information storage means carried out by a corresponding one of the first modification means and the second modification means in response to the corresponding one of the first instruction signal and the plurality of second instruction signals.

To attain the second object, according to a third aspect of the invention, there is provided a character information processing apparatus for printing at least one line of an input character string on a printing medium having a size limited at least in width thereof, the character information processing apparatus comprising:

layout attribute information storage means for storing information of settings concerning at least part of predetermined attributes concerning a layout of characters of the input character string, in a manner correlating the information of the settings with the input character string;

modification process-starting means for generating an instruction signal to start a modification process for modifying the information of the settings;

information modification means responsive to the instruction signal generated by the modification process-starting means, for modifying the information of the settings stored in the attribute information storage means by using menu screens containing, as menu options, information of all possible settings which can be set to the predetermined attributes concerning the layout of the characters of the input character string;

a plurality of indicators corresponding respectively to a plurality of settings of the predetermined attributes concerning the layout; and lighting means for lighting, when the information of the settings includes information of settings corresponding to any of the plurality of settings, lighting corresponding ones of the plurality of indicators.

To attain the second object, according to a fourth aspect of the invention, there is provided a character information processing apparatus for printing at least one line of an input character string on a printing medium having a size limited at least in width thereof, the character information processing apparatus comprising:

character modification attribute information storage means for storing information of settings of a character modification attribute of each character of the input character string;

modification process-starting means for generating an instruction signal to start a modification process for modifying the information of the settings;

information modification means responsive to the instruction signal generated by the modification process-starting means, for modifying the information of the settings of the character modification attribute stored in the character modification attribute information storage means by using menu screens containing, as menu options, information of all possible settings concerning the character information attribute;

a plurality of indicators corresponding respectively to a plurality of settings of the character modification attribute; and lighting means for lighting, when the information of the settings stored in the character modification information storage means includes information of settings corresponding to any of the plurality of settings, lighting corresponding ones of the plurality of indicators.

Preferably, the printing medium includes a transfer medium, and the printing of the at least one line of the input character string on the printing medium includes transfer printing of the at least one line of the input character string on the transfer medium.

The above and other objects, features, and advantages of the invention will be become more apparent from the following detailed description taken in conjunction with the accompanying drawings.

DETAILED DESCRIPTION

The invention will now be described in detail with reference to drawings showing an embodiment thereof. In this embodiment, a character information processing apparatus according to the invention is applied to a tape printing apparatus.

Figure 2:
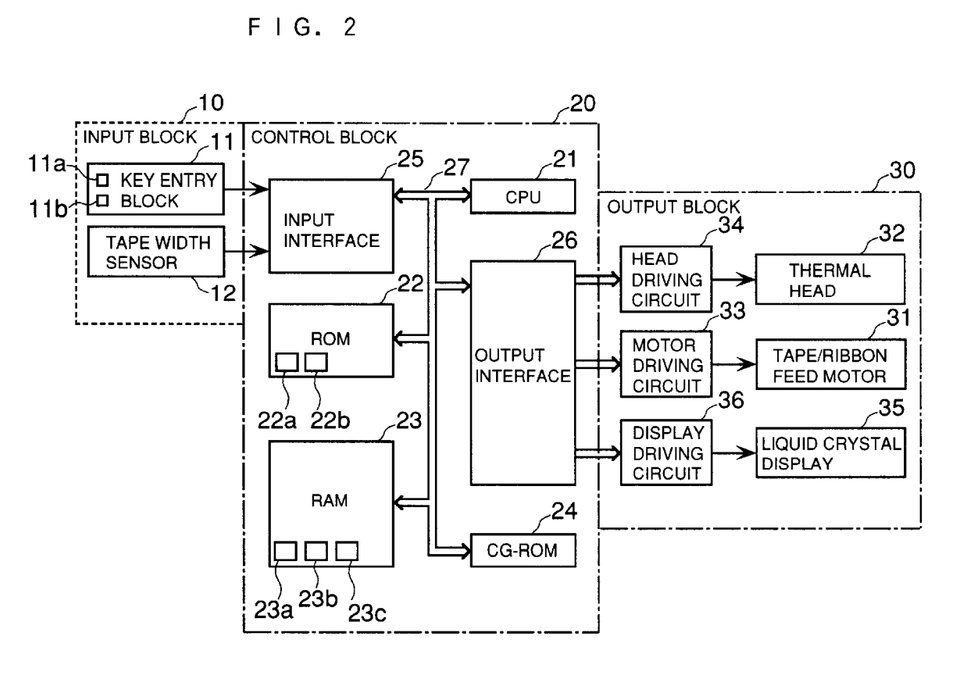
FIG. 2 is a block diagram showing the arrangement of electrical components of the character information processing apparatus.

Referring first to FIG. 2, there is shown the whole arrangement of electrical components of the tape printing apparatus according to the embodiment.

As shown in the figure, similarly to other information processing apparatus, the tape printing apparatus is mainly comprised of an input block 10, a control block 20, and an output block 30. The control block 20 executes various processing operations in response to information received from the input block 10, dependent on processing stages at each time point. Results of the processing operations are displayed or printed by the output block 30.

The input block 10 is comprised of a key entry block 11 having keys for depression and the like, and a tape width sensor 12 for detecting the width of a tape. The key entry block 11 generates character code data and various control data to be supplied to the control block 20. Description of details of the construction of the key entry block 11 is omitted. The tape width sensor 12 detects the width of a tape loaded in the apparatus and supplies information of the detected tape width to the control block 20. Actually, the tape is accommodated within a tape cartridge together with an ink ribbon, and the tape cartridge is formed with mechanical identification elements, such as holes, which form a pattern defining information of the width of the tape. The tape width sensor 12 senses the mechanical identification elements and outputs the information of the tape width. This information is used in determining character sizes for lines of characters.

In the present embodiment, the key entry block 11 includes a paragraph style key 11a which starts a modification process for modifying the paragraph style, described hereinafter.

Further, in this embodiment, the key entry block 11 has a character size-entrusting key 11b for instructing a change between two kinds of a character size-entrusting mode which is one of character size designation modes, i.e. between an auto-with-ease mode and a uniform mode. This is one of major features of this embodiment. The character size-entrusting key 11b may be a dedicated key exclusively used for instructing a change between the two kinds of the character size-entrusting mode, or may be constituted by a plurality of keys which are operated in combination to generate an instruction signal instructing the change of the character size-entrusting mode. Of course, from the viewpoint of operativity, the former is preferred.

The output block 30 is largely divided into a printing section and a display section. The printing section includes a tape/ribbon feed motor 31 formed e.g. by a stepping motor for feeding a tape and an ink ribbon, not shown, loaded in the apparatus to a predetermined printing position and then out of the apparatus, and a thermal head 32 immovably mounted in the apparatus, for printing on the running tape by thermal transfer. The thermal head 32 is capable of printing the maximum of 192 dots. It should be noted that the thermal head 32 may be of a movable type, and may be replaced by a head of a type other than thermal transfer type. The tape/ribbon feed motor 31 and the thermal head 32 are driven under the control of the control block 20 by a motor driving circuit 33 and a head driving circuit 34, respectively. The printed portion of the tape is cut off by a cutter, not shown, which is actuated by an external force by the user's manual operation or a motor, not shown.

Figure 3:
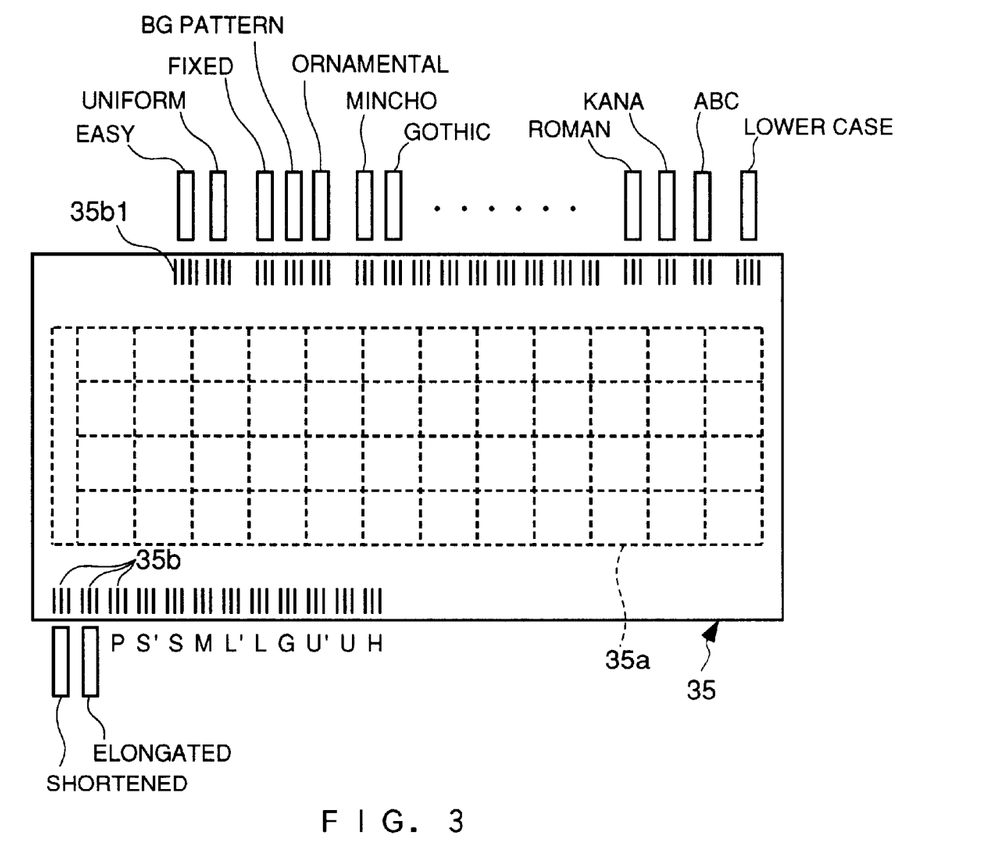
FIG. 3 is an explanatory view of a liquid crystal display according to the embodiment.

The display section of the tape printing apparatus according to the embodiment is comprised of a liquid crystal display 35, and a display driving circuit 36 for driving the liquid crystal display 35 under the control of the control block 20. The liquid crystal display 35 is largely constituted by a character string display area 35a and indicators 35b, as shown in FIG. 3. The character string display area 35a displays entered character springs, candidates of kanji characters in kana-kanji conversion (in the cape of a Japanese language-adapted type of the apparatus), various menu screens (see FIG. 5), print image screens, etc. The indicators 35b are arranged on vertically opposite sides of the character string display area 35a, and each indicate the status of setting of an attribute represented by each character string printed on the periphery of the display 35 of the apparatus.

This embodiment is characterized in that the indicators include 35b ones corresponding to the two types of character size-entrusting modes, that is, an indicator 35b1 which indicates whether or not the auto-with-ease (easy) mode is designated, by its on (lighted) or off (extinct) state, and an indicator 35b2 which indicates whether or not the uniform mode is designated by its on or off state. It should be noted that conventionally, only an indicator corresponding to a default mode of the two types (e.g. the auto-with-ease mode) has been provided for the character size attribute of each line.

The control block 20 is implemented e.g. by a microcomputer, and comprised of a CPU 21, a ROM 22, a RAM 23, a character generator ROM (CG-ROM) 24, an input interface 25, and an output interface 25, all of which are connected by a system bus 27.

The ROM 22 stores various processing programs, and fixed data including dictionary data for kana-kanji conversion (in the case of the Japanese language-adapted type of the apparatus), and stored paragraph style data, referred to hereinafter. The RAM 23 is used as a working memory, and also stores fixed data related to data entered by the user. The RAM 23 is battery backed up when the power of the apparatus is off. In FIG. 2, only the RAM 23 is shown, but it may include as part thereof a rewritable nonvolatile memory, such as EEPROM. The processing programs and the fixed data stored in the ROM 22, and the data stored in the RAM 23 will be described in detail hereinafter when describing the operation of the present embodiment.

It should be noted that the ROM 22 stores a paragraph style key-responsive processing program 22a which is executed in response to operation of the paragraph style key 11a, and a character size-entrusting key-responsive processing program 22b which is executed in response to operation of the character size-entrusting key 11b.

The CG-ROM 24 stores information of font of letters and symbols provided in the tape printing apparatus, and delivers font information in response to code data specifying a letter or symbol is supplied thereto. The font information stored in the CG-ROM 24 may be outline font or bit map font. Further, different pieces of font information may be stored for display and printing, respectively.

The input interface 25 interfaces between the input block 10 and the control block 20. The output interface 26 interfaces between the output block 30 and the control block 20.

The CPU 21 executes a processing program dependent on an input signal from the input block 10 or a processing stage at the time, by using the RAM 23 as the working area, and, if required, by using the fixed data stored in the ROM 22 and the RAM 23, and causes the status or results of the processing to be displayed on the liquid crystal display 35 or printed on a tape, not shown.

In the present embodiment, attributes of print data defining printing effects and ornamental effects to be imparted to a printed image of the text data are set in three different kinds of ranges, which are referred to hereinafter as "writing", "paragraph", and "character".

The range "writing" means a whole of input character strings. The attributes of "writing" include a background design, a label length, etc. The range "character" means a single character similarly to the ordinary concept of a character (as a single entity in the input character string). The attributes of "character" includes a typeface attribute, a character modification attribute(outline, italic, etc.). Therefore, the typeface attribute and the character modification attribute can be defined as "predetermined attributes which can be set to characters of an input character string on character-by-character basis".

Figure 4:
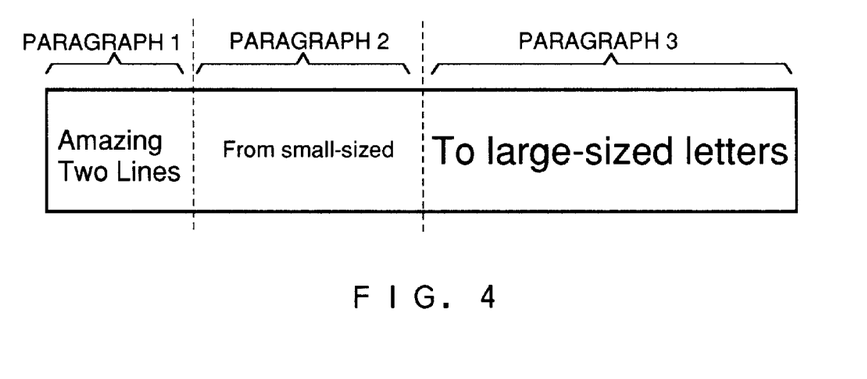
FIG. 4 is an explanatory view useful in explaining the concept of a paragraph according to the embodiment.

The range "paragraph" means each divisional portion of writing which is formed by lengthwise dividing the writing into at least one portion, as shown in FIG. 4. Each paragraph can have a different number of lines, and a different combination of character sizes set to the respective lines thereof. The attributes of a paragraph are hereinafter collectively referred to as "paragraph style".

The paragraph style in the present embodiment includes a character size attribute of each line, a layout attribute, an outer frame/table attribute defining whether or not ruled lines of an outer frame or a table should be set thereto. Therefore, the paragraph style can be defined as "predetermined attributes concerning a layout of characters of an input character string".

The tape printing apparatus stores there kinds of paragraph style data, i.e. "stored paragraph style data", "provisional paragraph style data", and "individual paragraph style data".

The individual paragraph style data is related to an input character string stored within text area 23a of the RAM 23, and defines paragraph style of each paragraph of the stored input character string. That is, different sets of paragraph style data can be set to respective paragraphs.

The provisional paragraph style data is data to be copied, when a new paragraph is generated by operation of a paragraph break-inserting key, not shown, as an initial set of individual paragraph style data defining the paragraph style of the new paragraph immediately after the generation thereof. The provisional paragraph style data is stored in a provisional paragraph style data storage area 23b of the RAM 23 (which is, in the present embodiment, intended to mean a concept including EEPROM). In short, the provisional paragraph style data is a source which provides default individual paragraph style data for a newly formed paragraph.

The individual paragraph style data and the provisional paragraph style data described above can be changed by the user.

On the other hand, the stored paragraph style data is data permanently stored in the tape printing apparatus, e.g. in the ROM 22 thereof. The stored paragraph style data is data to be copied as initial data of the provisional paragraph style data when the overall status of the apparatus has been cleared and the provisional paragraph style data has also been cleared.

The present embodiment of the invention has a novel feature concerning a method of modifying the individual paragraph style data, particularly settings of character sizes of respective lines.

In the present embodiment, there are two methods of changing the individual paragraph style data.

First, a procedure of operations for changing the paragraph style data by using menu screens, which is started in response to operation of the paragraph style key 11a, will be described with reference to FIGS. 5 and 6. It should be noted that in this method and a method of modifying provisional paragraph style data, operations are commonly carried out with very few exceptions.

Figure 5:
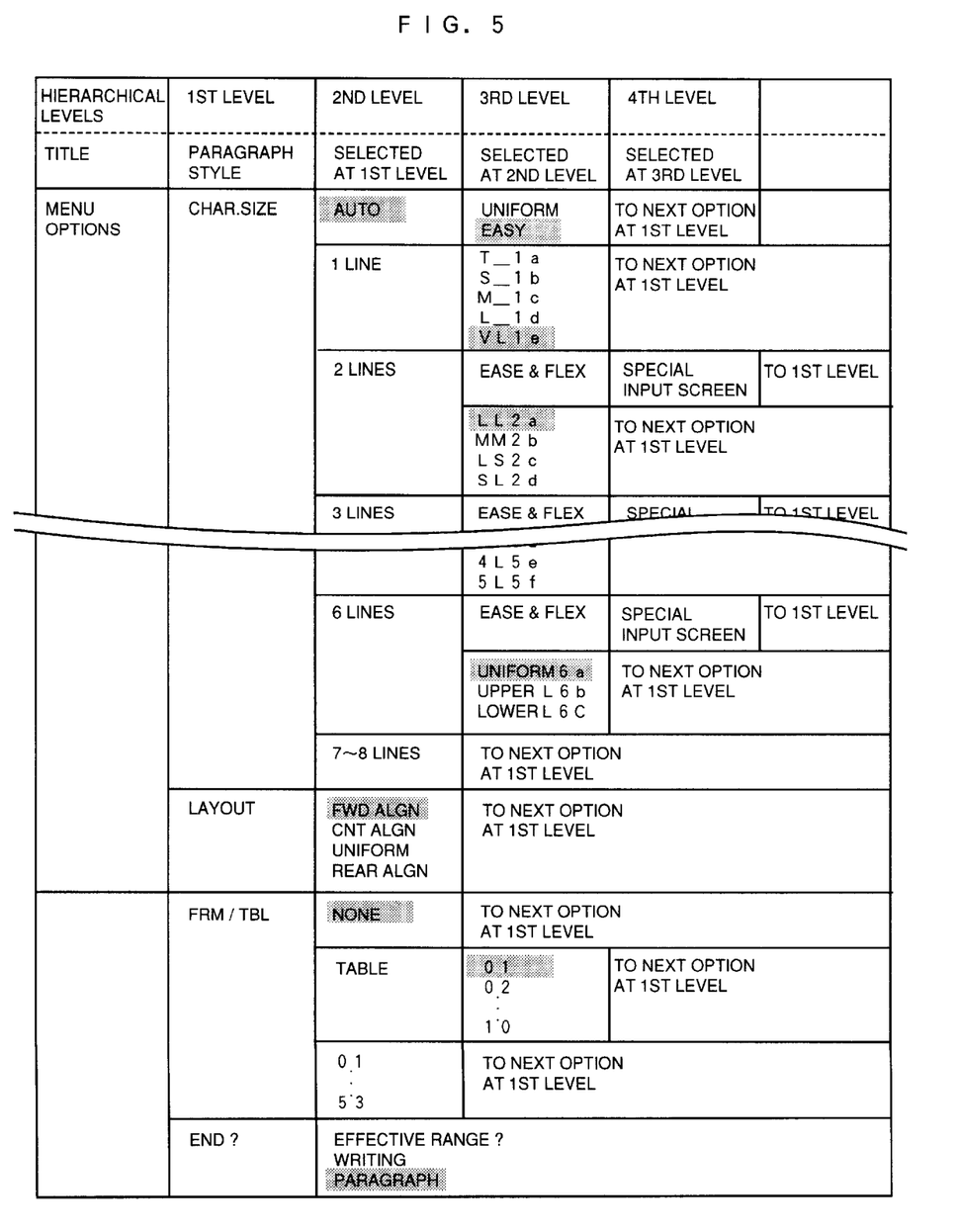
FIG. 5 is an explanatory view of a hierarchical arrangement of menu screens for paragraph styles according to the embodiment.

FIG. 5 schematically represents the hierarchical arrangement of the menu screens used in setting or modifying a paragraph style. It should be noted that the character string display area 35a of the liquid crystal display 35 has a size in which four lines×twelve characters can be displayed, and hence FIG. 5 menu screens are each partially and sequentially displayed as the user operates cursor keys, not shown, or the like.

In the FIG. 5 menu screens, a first hierarchical level provides the menu options of "CHAR. SIZE" (character size attribute for lines), "LAYOUT" (layout attribute), and "FRM/TBL"(outer frame/table attribute). The menu options at a second hierarchical level of the character size attribute of lines ("CHAR. SIZE") include "AUTO" representative of the character size-entrusting mode, "1 LINE, . . . , and "7–8 LINES". As menus options for the "AUTO" at a third hierarchical level, there are provided "EASY" representative of the "auto-with-ease" mode and "UNIFORM" representative of the uniform mode. As menu options for the "1 LINE, . . . , and "7–8 LINES", there are provided various combinations of relative character sizes. The menu options at a second hierarchical level of the layout attribute ("LAYOUT") are for the above-mentioned four kinds, i.e. "FWD ALGN" for the forward alignment, "CNT ALGN" for the center alignment, "UNIFORM" for the uniform layout, and "REAR ALGN" for the rearward alignment. The description of the arrangement of second and lower hierarchical levels of the layout attribute is omitted.

Figure 6:
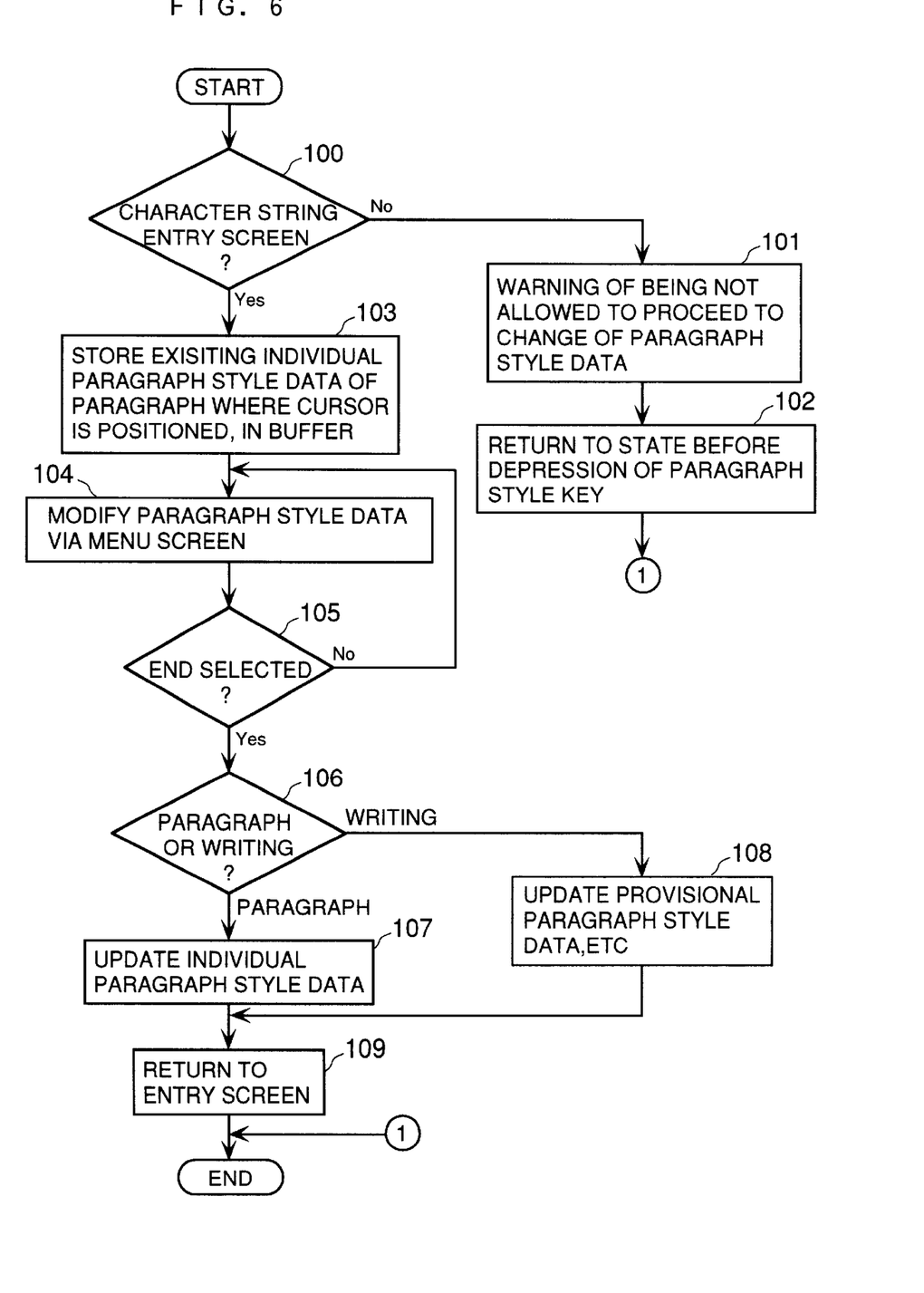
FIG. 6 is a flowchart showing a processing routine executed by the character information processing apparatus when a paragraph style key thereof is operated.

FIG. 6 shows a processing routine (paragraph style key responsive processing program) 22a which is started when the paragraph style key 11a is operated, and carried out in accordance with user's operations via corresponding ones of the menu screens, for changing paragraph style data (individual paragraph style data or provisional paragraph style data). It should be noted that the FIG. 6 modification processing is similar to processing carried out in the conventional tape printing apparatus, and an outline thereof is described to clarify the difference between the conventional method of paragraph style data modification and the second method of the same, described in detail hereinafter.

When the CPU 21 recognizes the operation of the paragraph style key 11a, it starts the FIG. 6 processing routine. First, it is determined whether or not the screen is a character string entry screen, and further if the screen is the character string entry screen, whether or not there remains an undetermined entry character in the input character string (step 100). It should be noted that the latter of these two determinations is required when the character conversion e.g.

from kana to kanji characters is carried out as in the case of the Japanese language-adapted type of the apparatus, and hence it may be omitted if entry of character strings does not require any character conversion as e.g. in the case of the English language-adapted type of the apparatus.

If the character string entry screen is not displayed (e.g. when a kanji character selection screen is displayed in the case of Japanese language-adapted type), or when any characters of the input character string remain undetermined in the character string entry screen (in the case of the Japanese language-adapted type), the CPU 21 causes the liquid crystal display 35 to display a message to the effect that the program cannot proceed to modification of the paragraph style data, at step 101, and in response to operation of any of the keys, or after the lapse of a predetermined time period, the display screen returns to the preceding one displayed before operation of the paragraph style key 11a, at step 102, followed by terminating the processing program 22a.

On the other hand, if the display screen is the character string entry screen (which contains only the determined characters of the input character string) when the paragraph style key 11a is operated, the CPU 21 reads individual paragraph style data of the paragraph where the cursor is positioned from the text area 23a, and copies the read data to a paragraph style data buffer 23c provided in the RAM 23, at step 103.

Thereafter, the CPU 21 permits the user to perform selecting operation in accordance with the FIG. 5 selection menu displayed on the screen, at step 104.

The selecting operation is carried out in the same manner as carried out in the prior art, and brief description thereof is given hereafter. In setting (modifying) various items of the paragraph style data by using corresponding ones of the menu screens, a change in the selected option on an identical hierarchical level is carried out by operation of any of the cursor keys, and a change to a lower hierarchical level is carried out by operation of a selection/enter keys, not shown. The depression of the selection/enter key in the state of an option on the lowermost hierarchical level sets this option to determined data for the attribute, and corresponding attribute data in the paragraph style data buffer 23c is overwritten by the determined data, followed by returning to a next option at the first hierarchical level.

The first option to be displayed with the cursor positioned thereat at each hierarchical level (except for the first hierarchical level) for each attribute is an option corresponding to the existing or currently-set data item of the attribute, which is stored in the paragraph style data buffer 23c. It should be noted that when displaying e.g. options at the lowermost hierarchical level, there can be a case in which an option other than one corresponding to the existing data item of the attribute stored in the paragraph style buffer 23 is required to be displayed as the default option. In such a case, an option corresponding to a data item of the stored paragraph style data or the provisional paragraph style data is set as the default option. The shaded options in FIG. 5 represent default options corresponding to respective data items of the stored paragraph style data or the provisional paragraph style data 23b.

The settings of character size attributes, the layout attributes, outer frame/table attributes can be changed as described above by pages through corresponding ones of the menu screens.

During setting or changing the various items of the paragraph style data by using corresponding ones of the menu screens, the CPU 21 waits for selection of "END" (menu option at the first hierarchical level) which instructs the termination of the setting (modifying) process at step 105.

When the menu option "END" is selected, the CPU 21 questions the user about the range of application of the modified paragraph style data, and determines the range according to the user's response at step 106. More specifically, it is determined whether or not the paragraph style data just modified should be applied to the paragraph where the cursor was positioned when the paragraph style key 11a was depressed, or to the whole writing (i.e. all of the paragraphs of the writing including paragraphs to be generated in the future).

If the user instructs that the paragraph style data just modified should be applied to the paragraph where the cursor was positioned when the paragraph style key 11a was depressed, the CPU 21 updates the individual paragraph style data accompanying the text data stored in the text area 23a by the data stored in the paragraph style data buffer 23c at step 107.

On the other hand, If the user instructs that the paragraph style data just modified should be applied not only to the paragraph where the cursor was positioned when the paragraph style key 11a was depressed but also to all the other paragraphs of the present writing, the CPU 21 updates the provisional style data as well as the individual paragraph style data of all the paragraphs, which accompany the text data stored in the text area 23a, by the data stored in the paragraph style data buffer 23c, at step 108.

When the update of the paragraph style data modified this time is thus completed, the CPU 21 causes the displayed screen to return to the character string entry screen at step 109, and terminates the whole process.

As a result of this modification, if the data concerning the character sizes of each line is set to the easy mode or the uniform mode, a corresponding indicator 35b1 or 35b2 is lighted. Further, an indicator corresponding to a character size of a character at which the cursor is positioned (size class ranked according to an absolute value of the size of the character) is also lighted. Indicators of character sizes are arranged on the lower side of the character string display area 35a with printed initials representative of the respective sizes. The method of converting the relative character sizes to the absolute ones is carried out in the same manner as in the prior art, and hence description thereof is omitted. Further, if the character string entry screen displayed before the paragraph style key 11a was depressed is one which simultaneously displays a print image, the print image modified according to the modified paragraph style data is displayed. It should be noted that as the character string entry screen, there are provided two types, one in which all the display area is used for displaying the input character string, and one in which one of the display area is used for displaying the input character string and the remaining area is used for displaying a print image thereof.

It should be noted that when the uniform mode (or the auto-with-ease mode) is set to the character size-related paragraph style data for each line, if the character size designation mode is changed to the auto-with-ease mode (or the uniform mode), by the FIG. 6 process, and the remaining attributes of the paragraph style are left as they are, the user has been conventionally required to carry out key operation at least ten times, though detailed description thereof is omitted.

Figure 1:
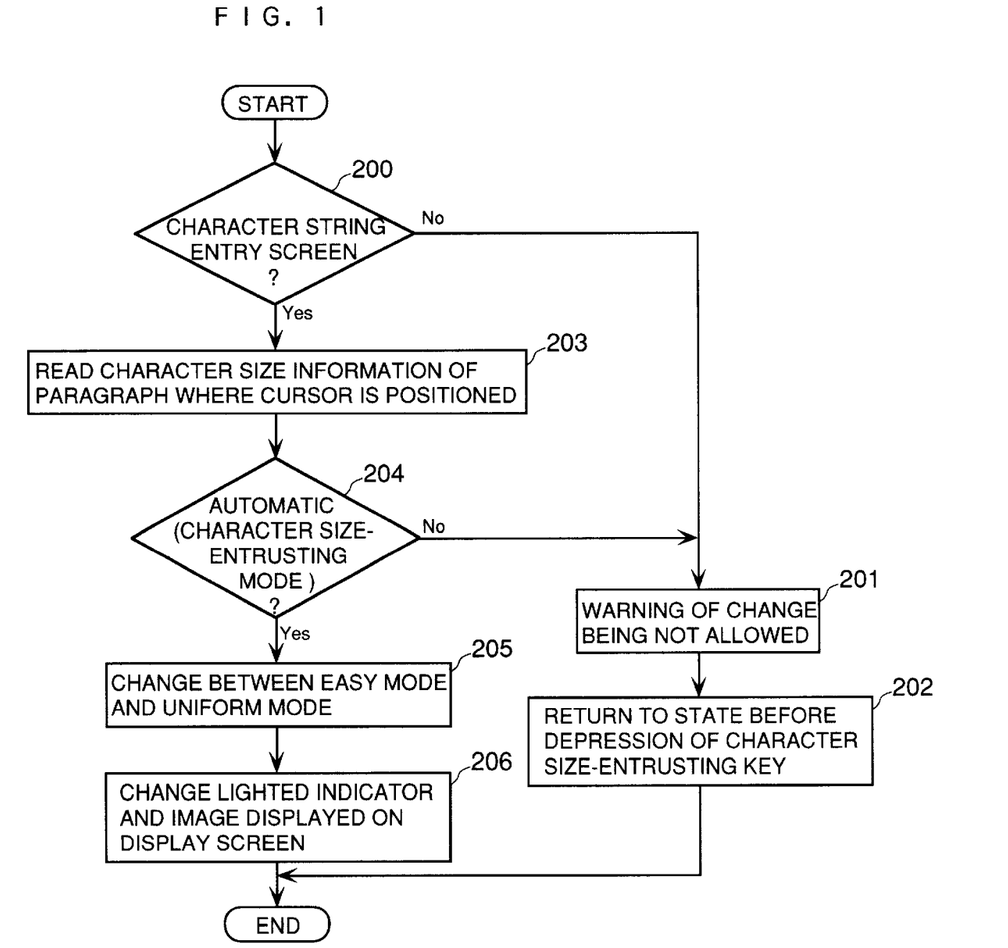
FIG. 1 is a flowchart showing a processing routine executed by a character information processing apparatus according to an embodiment of the invention when a character size-entrusting key thereof is operated.

Next, the method of modification of the paragraph style data without using the menu screens (procedure of operations carried out for modification of the paragraph style data) which is started in response to operation of the character size-entrusting key 11b will be described with reference to FIG. 1 illustrating a flowchart of a processing program 22b for changing individual paragraph style data without using the menu screens. It should be noted that the data which can be altered by this method is only character size data of each line out of the individual paragraph style data.

When the CPU 21 recognizes the operation of the character size-entrusting key 11b, it starts the FIG. 1 processing program 22b. First, it is determined whether or not the screen is a character string entry screen, and further if the screen is the character string entry screen, whether or not there remains an undetermined entry character in the input character string (step 200). It should be noted that the latter of these two determinations may be omitted e.g. in the case of the English language-adapted type of the apparatus, for the reason described hereinbefore.

If the character string entry screen is not displayed (e.g. when the kanji character selection screen is displayed in the case of the Japanese language-adapted type), or when any characters of the character string remain undetermined in the character string entered in the character string entry screen (in the case of the Japanese language-adapted type), the CPU 21 causes the liquid crystal display 35 to display a message informing the user that the program cannot proceed to modification of the paragraph style data, at step 201, and in response to operation of any of the keys, or after the lapse of a predetermined time period, the display screen returns to the preceding one displayed before operation of the paragraph style key 11a, at step 202, followed by terminating the processing program 22b.

On the other hand, if the display screen is the character string entry screen (which contains only the determined characters of the input character string) when the paragraph style-entrusting key 11b is operated, the CPU 21 extracts data of character sizes of lines of a paragraph where the cursor is positioned from individual paragraph style data of the paragraph, at step 203, and determines whether or not the extracted data is data setting the character size-entrusting mode (the auto-with-ease mode or the uniform mode), at step 204.

If the extracted data is not the character size attribute data setting the character size-entrusting mode, the program proceeds to the step 201, and in response to operation of any of the keys, or after the lapse of a predetermined time period, the display screen returns to the preceding one displayed before operation of the paragraph style key 11a at step 202, followed by terminating the processing program 22b.

On the other hand if the extracted data, i.e. the current data of character size attribute is the data designating the character size-entrusting mode, the CPU changes the current type of the character size-entrusting mode to the other type, i.e. causes character size attribute data designating the auto-with ease mode to overwrite character size attribute data designating the uniform mode, if the latter is the existing data, or causes character size attribute data designating the uniform mode to overwrite character size attribute data designating the auto-with ease mode, if the latter is the existing data, at step 205.

Then, the CPU 21 changes settings of indicators and an image displayed on the display at step 206, followed by terminating the whole process. For instance, if the updated data of the character size attribute of lines designates the auto-with-ease mode, the CPU 21 turns on the corresponding indicator 35b1, and at the same time turns off the indicator 35b2 corresponding to the uniform mode which has been lighted, and inversely, if the updated data of the character size attribute of lines designates the uniform mode, the CPU 21 turns on the corresponding indicator 35b1, and at the same time turns off the indicator 35b2 corresponding to the auto-with-ease mode which has been lighted. Further, an indicator corresponding to a character size of a character at which the cursor is positioned (size class ranked according to an absolute value of the size of the character) is also lighted. Further, if the character string entry screen displayed before the character size-entrusting key 11b was depressed is one which simultaneously displays a print image, the print image modified according to the auto-with-ease mode or the uniform mode to which the character size attribute is changed by the above process is displayed.

As described above, the character size attribute data of lines of a paragraph where the cursor is positioned can be changed between data items corresponding respectively to the two types of the character size-entrusting mode (the auto-with-ease mode and the uniform mode), only by depressing the character size-entrusting key 11b, without using the menu screens.

As described above, assuming, for instance, that character size attribute data of lines of a paragraph is set to data designating the uniform mode, according to the conventional method using the menu screens, to change character size attribute data of each line to data designating the auto-with-ease mode, and leave the remaining attributes of the paragraph style as they are, the user is required to carry out key operation at least ten times. However, according to the FIG. 1 process of the present embodiment, which is started with depression of the character size-entrusting key 11b, the user is only required to depress the character size-entrusting key 11b, i.e. key operation is required only once.

The tape printing apparatus according to the embodiment provides the following advantageous effects:

In setting the character sizes of lines, when a change between two types of the character size-entrusting mode is required, the user can effect the change without turning to the menu screens, only by a simple of operation of depressing the character size-entrusting key 11b.

In the present embodiment, the character size-entrusting key 11b is implemented by an auto-reset push key similarly to other entry keys. Therefore, there is no problem in providing the method of changing the character size-entrusting mode additionally or separately to the conventional method. For instance, if a toggle switch is provided as the character size-entrusting key 11b, one switch position corresponds to the auto-with-ease mode and the other switch position to the uniform mode, and hence a change made via a menu screen can conflict with the setting by the switch position. In contrast, if the auto-reset push key is employed, the position of the key itself does not correspond to the setting concerning the auto-with-ease mode or the uniform mode, and therefore, the change made via the menu screen cannot conflict with the position of the key.

Further, in practice, most users, particularly, beginning users more often apply only the two types of the character size-entrusting mode (auto-with-ease mode and uniform mode) to character size attribute data, and hence it is considered practically sufficient to provide means for changing between these two types independently of the method of modifying the paragraph style data via the menu screens. The method of designating relative character sizes dependent on the number of lines is used mostly by skilled users, and very rarely by begging users. Therefore, a change via menu screens is sufficient for this method of character size designation.

Further, in the embodiment described above, indicators indicative of active settings concerning the auto-with-ease mode and the uniform mode are provided, and hence the user can more readily grasp the settings of character sizes than the conventional apparatuses. That is, if the indicator 35b1 corresponding to the auto-with-ease mode is lighted, he can be aware of the fact the auto-with-ease mode is set, and if the indicator 35b2 corresponding to the uniform mode is lighted, he can be aware of the fact that the uniform mode is set. If the indicators 35b1 and 35b2 corresponding respectively to the auto-with-ease and the uniform mode are not lighted, he can be aware of the fact that a mode other than the character size-entrusting mode is set.

Based on the states of indicators, the user can correctly judge e.g. whether a modification of the paragraph style data can be made via the character size-entrusting key 11b.

Although in the above embodiment, character size data of each line modified in response to the depression of the character size-entrusting key 11b is applied to the paragraph where the cursor was positioned, this is not limitative, but the apparatus may be configured such that the modified data is applied to whole writing, or the user is permitted to select the range of application, as in the case of setting or modification carried out via the menu screens.

Further, although in the above embodiment, during execution of the processing program started in response to depression of the character size-entrusting key 11b, if the character size attribute data is neither data designating the auto-with-ease mode nor data designating the uniform mode, modification of the data is inhibited, this is not limitative, but a change to the auto-with-ease mode (or the uniform mode) may be allowed by attaching more importance to the depression of the character size-entrusting key 11b.

Further, although in the above embodiment, the character size-entrusting mode includes two modes, i.e. the auto-with-ease mode and the uniform mode, this is not limitative but three types of the character size-entrusting mode may be provided for selecting one of them in a cyclic manner whenever the character size-entrusting key 11b is depressed. In this case as well, it is preferable that a plurality of indicators are provided in a manner corresponding to these types. As a type of the character size-entrusting mode other than the auto-with-ease mode and the uniform mode, there may be mentioned one in which the character sizes of a line having a smallest number of characters and those of a line having a largest number of characters are determined such that length of a printed image of the line having the smallest number of characters is equal to length of a printed image of the line having the largest number of characters, and then the character sizes of the other lines are set to the character size of the line having the largest number of characters.

Further, in place of the character size-entrusting key, a character size-modifying key may be provided, whereby a change between all modes of designating the character sizes of lines (including the mode of designating relative character sizes of lines dependent on the number of lines) may be made in a cyclic manner whenever the character size-modifying key is depressed. In this variation as well, it is preferred that indications corresponding to the modes of designating the character sizes are provided.

The typeface attribute, the character modification attribute, and the layout attribute, described above, may be changed not only via the menu screens but also by operating a key directly instructing a change thereof in a cyclic manner.

Further, although in the above embodiment, by depressing the character size-entrusting key 11b, a change is made between the auto-with-ease mode and the uniform mode, this is not limitative, but an auto-with-ease mode key and a uniform mode key may be provided separately, thereby permitting a change between the two modes by depression of a selected one of these keys.

It should be noted that indicators indicating the auto-with-ease mode and the uniform mode are not limited to those utilizing segments of the liquid crystal display, but light emitting elements, such as LEDs, may be used instead.

The technique of providing a plurality of indicators in association with the modes of designating the character sizes described in the above embodiment is also applied to the tape printing apparatus which permits the modes of designation of the character sizes of lines to be set or changed via menu screens alone. Inversely, the tape printing apparatus which permits the modes of designation of the character sizes of lines to be set or changed by depression of the character size-entrusting key may be without the indicators associated with the character sizes. Further, the apparatus may be provided with one indicator for one mode.

Further, although in the above embodiment, the invention is applied to the tape printing apparatus, this is not limitative, but the invention can be applied to other character information processing apparatuses (e.g. stamp making apparatus) in which the character size attribute, the layout attribute, or the like is designated in the same manner as in the tape printing apparatus.

It is further understood by those skilled in the art that the foregoing is a preferred embodiment of the invention, and that various changes and modification may be made thereto without departing from the spirit and scope thereof.

What is claimed is:

1. A character information processing apparatus for printing at least one line of an input character string on a printing medium having a size limited at least in width thereof, the character information processing apparatus comprising:

attribute information storage means for storing information of settings concerning at least one attribute of a first kind of predetermined attributes concerning a layout of characters of said input character string and a second kind of predetermined attributes which can be set to said characters of said input character string on character-by-character basis, in a manner correlating said information of said settings with said input character string;

first modification process-starting means for generating a first instruction signal to start a modification process for modifying said information of said settings;

first information modification means responsive to said first instruction signal generated by said first modification process-starting means, for modifying said information of said settings stored in said attribute information storage means by using menu screens containing, as menu options, information of all settings which can be set to said first kind of said predetermined attributes and said second kind of said predetermined attributes;

second modification process-starting means for generating a second instruction signal for directly instructing modification of said information of said settings stored in said attribute information storage means; and second information modification means responsive to said second instruction signal generated by said second modification process-starting means, for modifying said information of said settings stored in said attribute information storage means according to a cyclic order assigned to a plurality of settings of said first kind of said predetermined attributes and said second kind of said predetermined attributes.

2. A character information processing apparatus according to claim 1, wherein said cyclic order is assigned to a plurality of settings of part of said first kind of said predetermined attributes and said second kind of said predetermined attributes, and if said information of settings concerning said at least one attribute stored in said attribute information storage means includes information of a setting of said part of said first kind and said predetermined attributes of said second kind when said second modification process-starting means generates said second instruction signal, said second information modification means changes said setting of said part to a next setting in said cyclic order.

3. A character information processing apparatus according to claim 2, wherein when said second modification process-starting means generates said second instruction signal, if it is impossible to change said information of said settings such that said information of said settings includes information of said next setting in said cyclic order, said second information modifications means does not execute modification of said information of said settings.

4. A character information processing apparatus according to claim 1, including print image-updating means for updating an image for printing displayed in combination with a character entry screen immediately before any one of said first modification process-starting means and said second modification process-starting means generates a corresponding one of said first instruction signal and said second instruction signal, in accordance with modification of said information of said settings stored in said attribute information storage means carried out by a corresponding one of said first modification means and said second modification means in response to said corresponding one of said first instruction signal and said second instruction signal.

5. A character information processing apparatus for printing at least one line of an input character string on a printing medium having a size limited at least in width thereof, the character information processing apparatus comprising:

attribute information storage means for storing information of settings concerning at least one attribute of a first kind of predetermined attributes concerning a layout of characters of said input character string and a second kind of predetermined attributes which can be set to said characters of said input character string on character-by-character basis, in a manner correlating said information of said settings with said input character string;

first modification process-starting means for generating a first instruction signal to start a modification process for modifying said information of said settings;

first information modification means responsive to said first instruction signal generated by said first modification process-starting means, for modifying said information of said settings stored in said attribute information storage means by using menu screens containing, as menu options, information of all settings which can be set to said first kind of said predetermined attributes and said second kind of said predetermined attributes;

a plurality of second modification process-starting means corresponding respectively to at least part of settings concerning said first kind of said predetermined attributes and said second kind of said predetermined attributes, for generating respective second instruction signals for directly instructing modification of said information of said settings stored in said attribute information storage means; and second information modification means responsive to any one of said second instruction signals generated by a corresponding one of said plurality of second modification process-starting means, for modifying said information of said settings stored in said attribute information storage means such that said information of said settings includes information of a setting corresponding to said corresponding one of said plurality of second modification process-starting means.

6. A character information processing apparatus according to claim 5, wherein when said corresponding one of said plurality of second modification process-starting means generates said any one of said plurality of second instruction signals, if it is impossible to change said information of said settings such that said information of said settings includes information of said setting corresponding to said corresponding one of said plurality of second modification process-starting means, said second information modifications means does not execute modification of said information of said settings.

7. A character information processing apparatus according to claim 1 or 5, including a plurality of indicators corresponding to a plurality of settings each of which can be set by said second information modification means, and lighting means for, when said second information modification means has modified said information of said settings stored in said attribute information storage means, lighting at least one of said plurality of indicators corresponding to settings resulting from the modification.

8. A character information processing apparatus according to claim 1 or 5, wherein said information of said settings concerning said at least one attribute includes information of designation of a character size for each line.

9. A character information processing apparatus according to claim 8, wherein a plurality of settings concerning a predetermined attribute each of which can be set by said second information modification means includes a setting in which character sizes for lines are automatically designated such that all of said lines have substantially the same length when said lines are printed on said printing medium, and a setting in which said character sizes for said lines are automatically set to an identical character size.

10. A character information processing apparatus according to claim 1 or 5, wherein said information of said settings concerning said at least one attribute includes information of designation concerning a layout attribute of characters on a corresponding line of said input character string.

11. A character information processing apparatus according to claim 1 or 5, wherein said information of said settings concerning said at least one attribute includes information of designation concerning a typeface attribute of each character of said input character string.

12. A character information processing apparatus according to claim 1 or 5, wherein said information of said settings concerning said at least one attribute includes information of designation concerning a character modification attribute of each character of said input character string.

13. A character information processing apparatus according to claim 5, including print image-updating means for updating an image for printing displayed in combination with a character entry screen immediately before any one of said first modification process-starting means and said plurality of second modification process-starting means generates a corresponding one of said first instruction signal and said plurality of second instruction signals, in accordance with modification of said information of said settings stored in said attribute information storage means carried out by a corresponding one of said first modification means and said second modification means in response to said corresponding one of said first instruction signal and said plurality of second instruction signals.

14. A character information processing apparatus for printing at least one line of an input character string on a printing medium having a size limited at least in width thereof, the character information processing apparatus comprising:

layout attribute information storage means for storing information of settings concerning at least part of predetermined attributes concerning a layout of characters of said input character string, in a manner correlating said information of said settings with said input character string;

modification process-starting means for generating an instruction signal to start a modification process for modifying said information of said settings;

information modification means responsive to said instruction signal generated by said modification process-starting means, for modifying said information of said settings stored in said attribute information storage means by using menu screens containing, as menu options, information of all possible settings which can be set to said predetermined attributes concerning said layout of said characters of said input character string;

a plurality of indicators corresponding respectively to a plurality of settings of said predetermined attributes concerning said layout; and     lighting means for lighting, when said information of said settings includes information of settings corresponding to any of said plurality of settings, lighting corresponding ones of said plurality of indicators.

15. A character information processing apparatus for printing at least one line of an input character string on a printing medium having a size limited at least in width thereof, the character information processing apparatus comprising:

character modification attribute information storage means for storing information of settings of a character modification attribute of each character of said input character string;

modification process-starting means for generating an instruction signal to start a modification process for modifying said information of said settings;

information modification means responsive to said instruction signal generated by said modification process-starting means, for modifying said information of said settings of said character modification attribute stored in said character modification attribute information storage means by using menu screens containing, as menu options, information of all possible settings concerning said character information attribute;

a plurality of indicators corresponding respectively to a plurality of settings of said character modification attribute; and     lighting means for lighting, when said information of said settings stored in said character modification information storage means includes information of settings corresponding to any of said plurality of settings, lighting corresponding ones of said plurality of indicators.

16. A character information processing apparatus according to claim 1, 5, 14, or 15 wherein said printing medium includes a transfer medium, and said printing of said at least one line of said input character string on said printing medium includes transfer printing of said at least one line of said input character string on said transfer medium.

* * * * *